United States Patent [19]

Upadrasta

[11] Patent Number: 5,872,820
[45] Date of Patent: Feb. 16, 1999

[54] SYNCHRONIZATION IN TDMA SYSTEMS IN A NON-REALTIME FASHION

[75] Inventor: Prasad V. Upadrasta, Tempe, Ariz.

[73] Assignee: Intel Corporation, Santa Clara, Calif.

[21] Appl. No.: 720,445

[22] Filed: Sep. 30, 1996

[51] Int. Cl.$^6$ ........................................................ H04L 7/00
[52] U.S. Cl. ........................... 375/356; 370/324; 370/509
[58] Field of Search .................................. 375/356, 354; 370/321, 324, 442, 509, 503

[56] References Cited

U.S. PATENT DOCUMENTS

| | | | |
|---|---|---|---|
| 4,287,597 | 9/1981 | Paynter et al. | 455/12 |
| 4,543,657 | 9/1985 | Wilkinson | 375/200 |
| 5,361,277 | 11/1994 | Grover | 375/356 |
| 5,613,195 | 3/1997 | Ooi | 455/13.2 |

FOREIGN PATENT DOCUMENTS

| | | | |
|---|---|---|---|
| 8033037 | 2/1996 | Japan | H04Q 7/36 |

*Primary Examiner*—Chi H. Pham
*Assistant Examiner*—Bryan Webster
*Attorney, Agent, or Firm*—Blakely, Sokoloff, Taylor & Zafman LLP

[57] ABSTRACT

A method and apparatus for synchronization between a base station sub-system and a mobile station. The mobile station listens for a message frame number which is generated by the base station sub-system. The mobile station includes a mobile frame number counter which tracks the progression of frame numbers. When first powered-up, the mobile frame number counter may not be synchronized with the base station sub-system. The frame numbers of the base station sub-system and mobile frame number counter values are continuously incremented to track the progression of frame numbers in real-time. To effect synchronization, a received and decoded frame number is loaded into the counter. Then, a time lag is calculated which represents the delay inherent in receiving and decoding, within the mobile station and its components, frame numbers from the base-station sub-system. The time lag is then added to the mobile frame number counter of the mobile station so that the mobile frame number counter is synchronized with the base station sub-system.

15 Claims, 5 Drawing Sheets

SYNCHRONIZATION IN TDMA SYSTEMS IN A NON-REALTIME FASHION

BACKGROUND OF THE INVENTION

1. Field of the Invention

The present invention relates to the field of data communications. More specifically, the present invention relates to synchronization in time-division multiple access systems.

2. Description of Related Art

In systems that employ Time Division Multiple Access (TDMA) schemes for sharing a radio spectrum between several simultaneous communications, such as Global System for Mobile Communications (GSM), synchronization of clocking mechanisms is vital to their reliable operation. In TDMA as utilized in GSM, a given frequency bandwidth carries information in a number of separate "slots," with each slot carrying a single "burst" which is the minimum transmission unit. A series of slots composes a frame, and it is with the unit of the frame that synchronization must be achieved.

In a GSM, a base station sub-system (BSS) contacts a multitude of mobile stations using a radio interface, and thereby maintains a communication pathway to the mobile stations. Typical examples of mobile stations (MS) include hand-held cellular telephones and mobile cellular telephones (car phones). Mobile stations must synchronize with their base stations after the mobile stations are powered up such that the mobile station and base station will be referring to the same frame number when communicating. However, due to the propagation delay inherent in communicating the frame between the MS and the BSS, a frame number assigned at the BSS does not correspond to the frame number generated by timing circuits at the MS. Further, when a frame number is decoded at the MS for use by a controller, which is a part of the mobile station, there may be an additional time lag before the controller can recognize the frame number.

One solution to synchronize and account for propagation delay is to set timers in real-time fashion on Digital Signal Processors within the MS. This solution fails if a controller, which must separately communicate with the DSP to obtain the frame number, is to be synchronized with the BSS. The extra time lag from the DSP to the controller must be taken into account if the controller is to handle functions related to message frames traditionally handled instead by the DSP. The controller must be synchronized with the base station if the controller carries out the timing (i.e. frame number generation) rather than the DSP.

Thus, a solution is needed that can perform synchronization in a non-real-time fashion on the controller rather than the digital signal processor.

SUMMARY

The invention provides a method and apparatus for synchronization of frame numbers between a base station sub-system and a mobile station. The mobile station is continuously listening for a message frame number which represents timing information of a frame number counter of the base station sub-system. The mobile station includes a mobile frame number counter which tracks the progression of frame numbers, but when first powered-up, may not be synchronized with the message frame number received from the base station sub-system. The message frame numbers of the base station sub-system and mobile frame number counter values are continuously incremented to track the progression of frame numbers in real-time. To effect synchronization, the mobile station loads a first message frame number into the mobile frame number counter, regardless of the current value the counter may hold, when a first message frame is received from the base station sub-system and decoded by a digital signal processor for the first message number. The mobile station listens again for a second message frame and stores the value of the mobile frame number counter into a register or memory location. The digital signal processor decodes the second message frame for a second message frame number. When the second message frame number is decoded, the second message frame number is sent to the controller. The controller calculates time lag as the difference between the value of the mobile frame number counter as stored in the register or memory location and the second message frame number. The time lag represents the delay in decoding and sending the frame number to the controller. The amount of time lag is added to the mobile frame number counter of the mobile station so that the mobile frame number counter is synchronized with the base station sub-system.

DETAILED DESCRIPTION OF THE INVENTION

Figure 1:
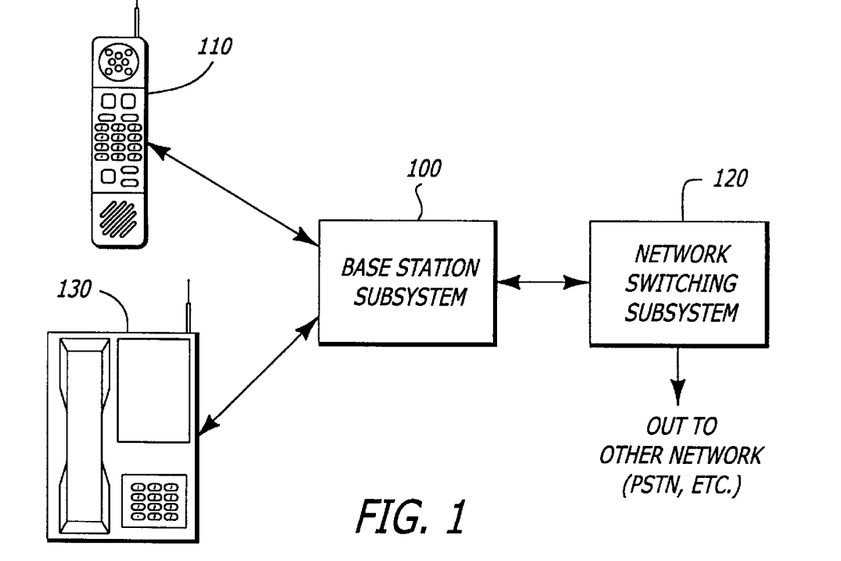
FIG. 1 shows a typical cellular network built around GSM.

FIG. 1 shows a typical cellular network built around GSM.

FIG. 1 shows a base station sub-system (BSS) 100 which interfaces with one or more mobile stations such as the two mobile stations 110 and 130. BSS 100 communicates with each mobile station (MS) through high-frequency radio waves usually on the order of several hundred Megahertz. The information between BSS 100 and MS 110 or MS 130 is carried on "bursts" which are each composed of a series of modulated bits. Each burst has a finite duration and is carried in time and frequency windows called "slots." Each slot represents a user "channel" and thus for transmitting messages for MS 110 and MS 130, two slots or channels, one for each mobile station, could be utilized. In the Time Division Multiple Access (TDMA) aspect of GSM, each slot recurs in a "burst period" of about 0.577 milliseconds. A group of slots composes a message "frame" and it is with the unit of the message frame that synchronization between each of the mobile stations MS 110 and MS 130 with BSS 100 must be achieved. The mobile stations MS 110 and MS 130 and base station sub-system BSS 100 each have their own continuously running frame counters which are used to assign frame numbers to message frames so that they can be properly decoded and sequenced.

Also illustrated in FIG. 1 is a Network Switching Subsystem (NSS) 120 which handles switching of messages incoming to the cellular network area governed by the BSS 100. NSS 120 is the interface allowing mobile stations to receive and transmit information to other networks such as a Public Switched Telephone Network (PSTN). Since communications between the mobile stations and the BSS 100 are the primary focus of synchronization, the NSS 120 will not be discussed in detail.

Figure 2:
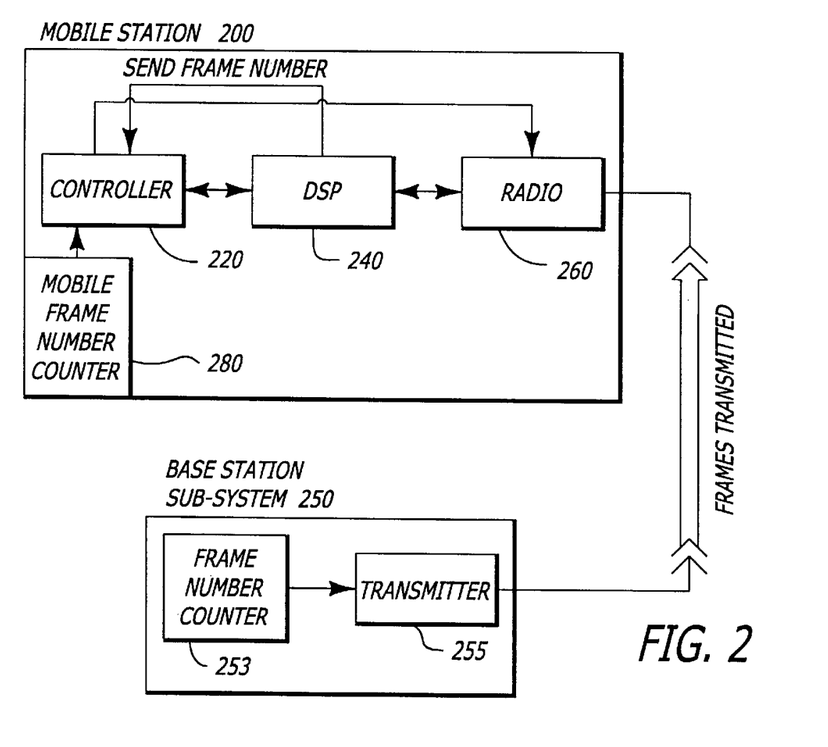
FIG. 2 shows a mobile station in greater detail.

FIG. 2 shows a mobile station in greater detail. FIG. 2 shows a mobile station (MS) 200 with four components—a controller 220, a Digital Signal Processor (DSP) 240, a radio interference 260 and a mobile frame number counter 280. Though mobile frame counter 280 is shown as a separate component in FIG. 2, it will be understood that the frame counter may actually physically reside as part of the controller, and need not be physically separate.

MS 200 communicates using radio 260 to a base station sub-system (BSS) 250 through an antenna or other signaling device (not shown). BSS 250 is equipped with a transmitter 255 for transmitting frames of information to MS 200 which receives the frames through radio interference 260. The problem of synchronization is as follows:

When MS 200 is first "powered up" (i.e., when the cellular phone is turned on), the mobile frame number counter 280 is started and runs continuously to progress frame number information without ceasing until the MS 200 is powered down. At the BSS 250, however, a frame number counter 253 has already been running for an unknown length of time from the perspective of MS 200. Frame number counter 253 is continuously running prior to the power-up of MS 200 since there may be other mobile stations which require message frames to be transmitted to them and thus, frame number assignment must always be available at BSS 250 if messages are to be carried. The problem of unsynchronized timing occurs because frame number counter 253 and mobile frame number counter 280 have started at different values and are therefore always producing different values at a given time. This problem has traditionally been corrected by DSP 240 of MS 200. However, if synchronization is needed on the controller 220, rather than DSP 240, there must be a mechanism on controller 220 which can synchronize the values of mobile frame number counter 280 with frame number counter 280.

The controller 220, which is digital, can handle most, if not all of the sequencing of frame information and so if the controller is to perform functions ordinarily executed on the DSP, the controller must have the proper frame number. Even though the DSP 240 does serve to initially decode analog encoded information that it receives from radio 260, such as message frame number information, and since analog-to-digital conversion is not handled on the controller, the frame number must be "transmitted" to the controller 220 from DSP 240. In transmitting the frame number, there may be an inherent time lag in transmitting that causes the frame number value produced by mobile frame number counter 280 to progress (increment) itself before the controller 220 receives the frame number of the message as decoded by DSP 260.

For example, if a message with a frame number of "9" is generated at the BSS 250 and then sent to MS 200, if it takes more than a whole frame duration of time for that frame number to be received by the controller, then the actual message frame number as assigned by BSS 250 will be "10" rather than "9" as seen by the controller. Thus even if mobile frame number counter 280 is reset to a value of "9" in an attempt to synchronize with the BSS, the synchronization will be incorrect since during the time of transmitting the frame number to the controller, the frame number of BSS 250 and counter 253 will have progressed. This possible change in frame number must, therefore, be accounted for.

If DSP 240 and controller 220 are embedded on the same processor, or act as the controller 220 a master of slave DSP 240, the same problem of synchronization may exist. Though the controller 220 is shown as part of a mobile station, the controller 220 may be an integral part of another system, such as personal computer, while the DSP resides on the communications device. In such an instance, where the controller may be required to track frame numbers and perform digital timing, the counter of the controller must be in sync with the base station. The problem is enhanced in such an instance since the DSP which receives and decodes the frame number of the base station is a component of one device, the communications device, while the controller is a part of another device, namely, the computer system.

Figure 3:
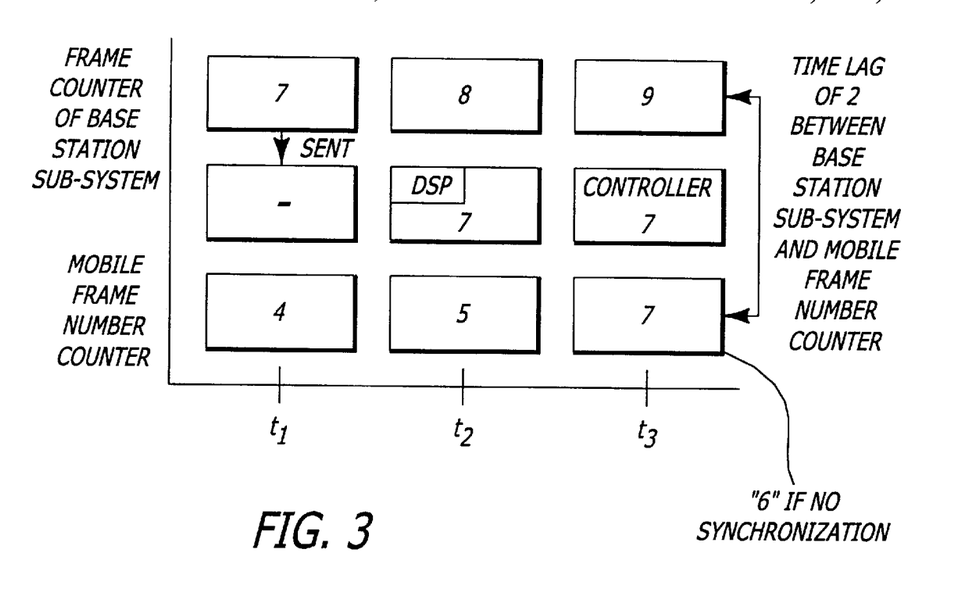
FIG. 3 shows a time index of events in a sample case of attempted synchronization.

This problem is illustrated in the timing diagram of FIG. 3. FIG. 3 shows a time index of events in a sample case of attempted synchronization. At time $t_1$, prior to any synchronization, the BSS sends out a frame numbered "7" in accordance with the frame number generated by the frame number counter of the BSS. Prior to synchronization, the mobile frame number counter shows a value of "4" as the frame number. At time $t_2$, the mobile frame counter will have progressed to "5" and the frame number counter of the BSS to "8". At time $t_2$, the DSP has received and decoded the frame number as being "7". At time $t_3$, the decoded frame number has finally been received by the controller. Also at time $t_3$, the mobile frame counter has progressed to "6" while the frame number counter of the BSS has progressed to "9". The controller receives the value of the previously decoded frame which is "7". An attempt to synchronize the mobile frame number counter to a value of "7" in accordance with what the controller sees will leave the mobile frame number counter two frames behind the base station sub-system frame number counter value of "9". Thus, a method and apparatus is needed to correct for the time lag in communicating the frame number to the controller and thereby, allow the mobile frame number counter to be synchronized exactly with the BSS.

Figure 4:
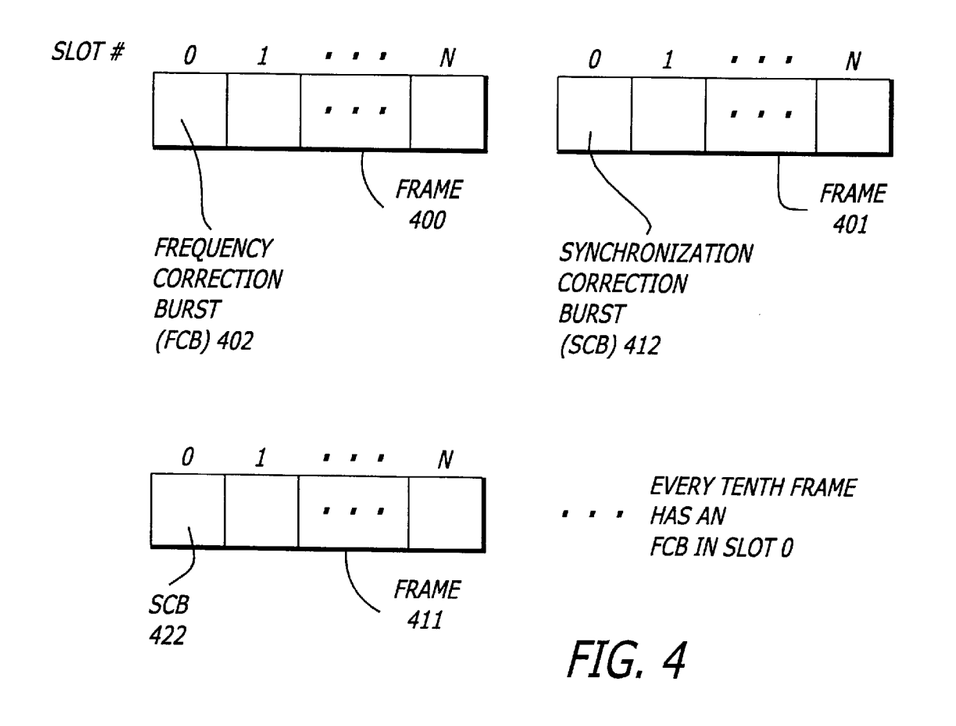
FIG. 4 shows the information within frames which allow synchronization.

FIG. 4 shows the information within frames which allow synchronization.

The BSS sends a multitude of frames, such as frame 400 shown on FIG. 4, with a special beacon signal known as a Frequency Correction Burst (FCB). The FCB 402, which is carried on burst/slot 0 of frame 400, has a very large (if not the largest) signal strength of all bursts carried. GSM can send frames on any of 124 different frequencies. The radio is instructed by the controller to listen on all frequencies for FCB 402. The DSP receives all signals from the radio and sorts the signals according to their strength (amplitude), and picks the signal with a strength resembling FCB 402. The controller is then tuned and can tune the radio to listen for all incoming message frames on the same frequency as the FCB 402. The controller tunes the radio to listen for an explicit frequency based on signal strength of received signals and is thus able to determine which FCB, of the many that may be broadcast over the entire spectrum, is destined for that particular MS.

Once FCB 402 has been detected, the controller listens for a Synchronization Burst (SCB) 412 as shown in frame 410 of FIG. 4. The SCB 412, which is also carried on burst/slot 0 of the frames, encodes the frame number information and has a distinct signal strength. The DSP decodes the frame number information carried within SCB 412 and sends frame number information to the controller. Using the frame number information of the SCB 412, synchronization may be achieved, but must also correct for the time lag that may occur in decoding the frame number information and passing it to the controller. Every tenth frame thereafter, such as frame 411, also has an SCB such as SCB 422, similar to SCB 412 for the purpose of synchronization. The FCB repeats its position at slot 0 every tenth frame. On the next successive frame, an SCB takes the place of the FCB at slot 0, and thereafter, like the FCB, repeats every tenth frame.

Figure 5:
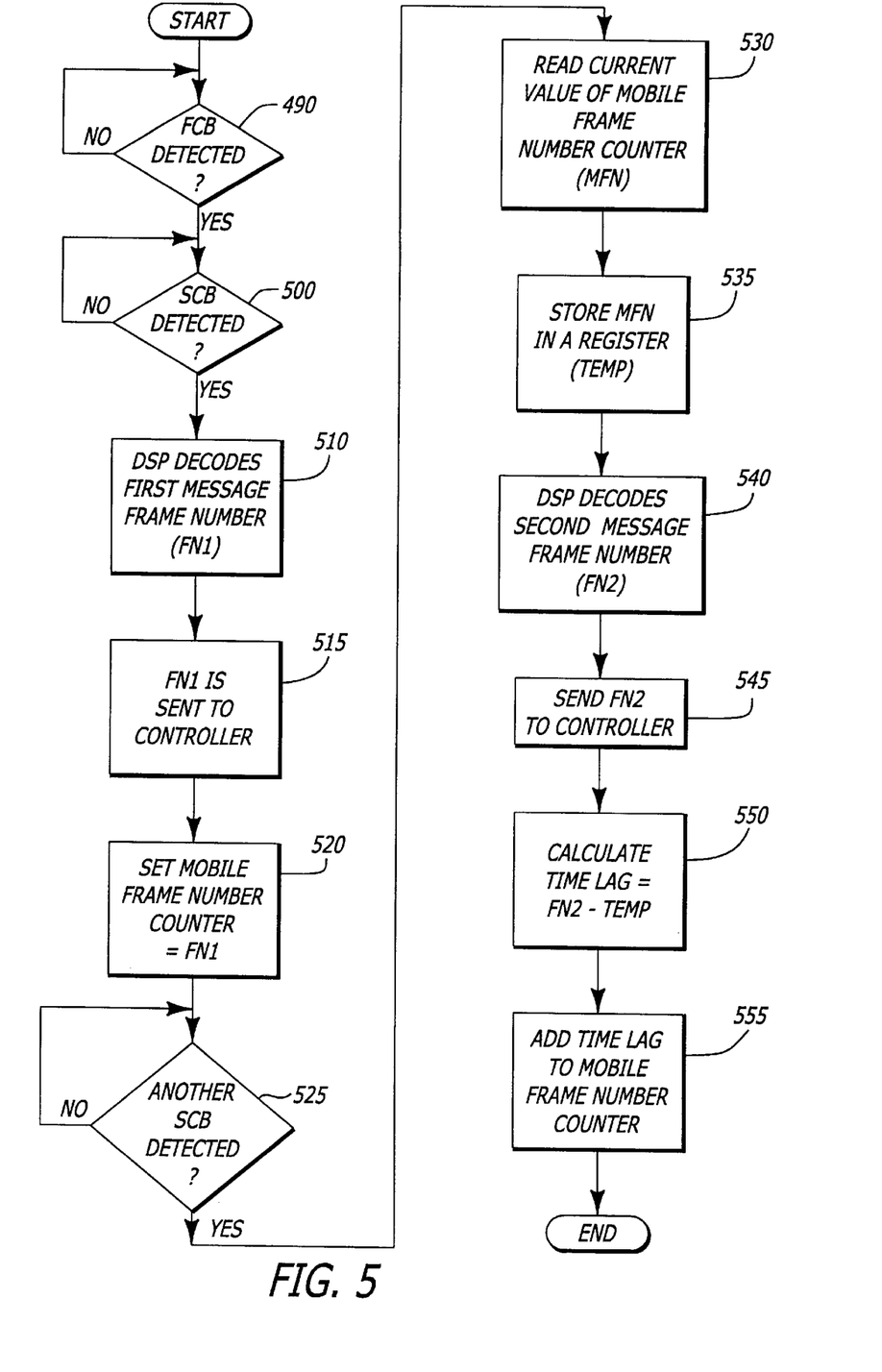
FIG. 5 shows a method for synchronizing the mobile frame number counter exactly with the message frame number received from the BSS.

FIG. 5 shows a method for synchronizing the mobile frame number counter exactly with the message frame number received from the BSS.

First, upon power-up of a mobile station, according to step 490, the radio is listening for an FCB, a frequency correction burst, and will not attempt to listen for the SCB (synchronization burst) until it detects an FCB. If an FCB is detected, then, at step 500, the radio and DSP are continuously listening to detect an SCB. If an SCB is detected, then according to step 510, the DSP (Digital Signal Processor) decodes a first message frame number (signified as "FN1") by extracting frame number information encoded in the SCB signal. The message frame number needs to be sent to the controller if it is to be of use, and thus, according to step 515, FN1 is sent to the controller. The controller or other circuitry, according to step 520, sets the mobile frame number counter equal to FN1.

Thereafter, the radio is instructed to listen for the next SCB signal (step 525). If another SCB is detected, then according to step 530, the controller reads in the current mobile frame number counter value (designated by "MFN"). According to step 535, the controller/circuitry stores MFN into a temporary register or memory location, buffer or other memory (designated by "TEMP"). According to step 540, the DSP decodes a second message frame number (designated by "FN2"). Then at step 545, FN2 is then sent to the controller.

At step 550, the controller/circuitry calculates a value TIME_LAG as the difference between FN2 and TEMP. The expression FN2 minus TEMP will always evaluate to a whole number, since the value of TEMP can at best be equivalent to FN2, and is more typically, less than FN2 before synchronization. Then, according to step 555, the value TIME_LAG is added to the mobile frame number counter. TIME_represents the amount of time, in frames, that it takes to decode and send the message frame numbers from the DSP to the controller. Thus, adding TIME_to the mobile frame number counter accounts for the internal delay of the mobile station in decoding and sending the frame number to the controller, and therefore perfectly synchronizes the mobile frame number counter on the controller with the frame numbers of message frames as the messages are processed by the controller.

Figure 6:
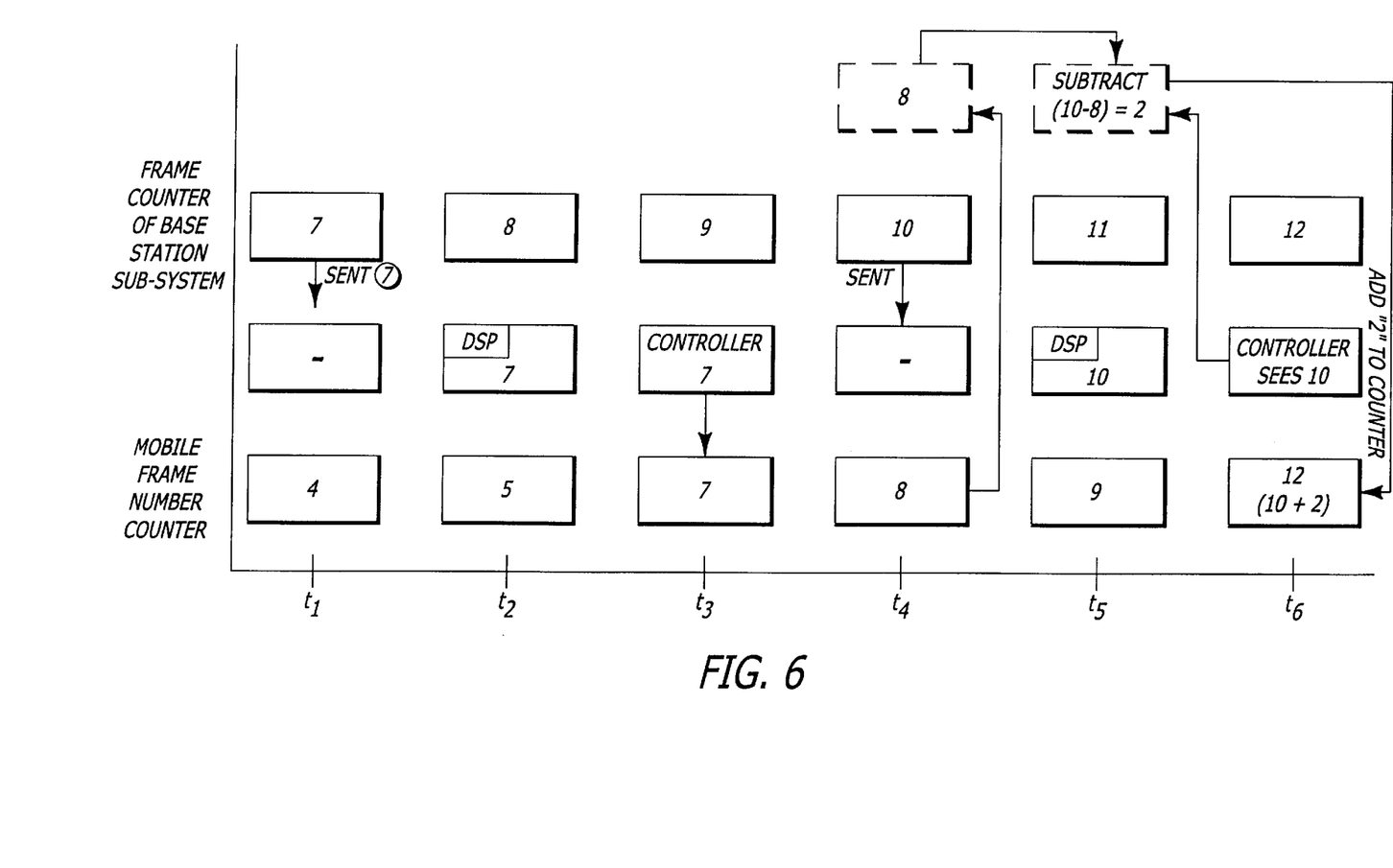
FIG. 6 illustrates a time index of how the problematic un-synchronized frame counter illustrated in FIG. 3 is synchronized according to the invention.

FIG. 6 illustrates a time index of how the problematic un-synchronized frame counter illustrated in FIG. 3 is synchronized according to the invention.

At time $t_1$ and time $t_2$, the time index behavior is the same as FIG. 3. At time $t_1$, when the BSS sends a message frame numbered "7", the mobile frame number counter holds some arbitrary value ("4" in this example). At time $t_2$, the mobile frame counter has advanced to "5" and the DSP has finished decoding the frame number of the message, which is "7". However, at time 2, the BSS has already advanced its frame number counter to "8".

According to the method of FIG. 5, at time $t_3$ when the controller can finally "see" (is passed) the frame number "7", the BSS frame number has already progressed to "9". According to step 520 of FIG. 5, the mobile frame number counter is loaded with the value "7" (which is the message frame number). At this point, the synchronization is partially achieved, but still a time lag in decoding the frame number and transmitting it to the controller is not accounted for. Thus, the mobile frame number counter is still at "7" while the BSS is currently transmitting "9" as the frame number. To correct this lag, another sequence of steps must be performed.

At time $t_4$, the BSS has sent out another message frame, this time with a frame number of "10". Also, at time $t_4$, the mobile frame number counter, which is constantly running, has advanced to frame "8" (one more than "7" to which it was reset at time $t_3$). At time $t_4$, the controller is adapted to read the current value of the mobile frame counter ("8") and stores it into a register or memory location. At time $t_5$, the mobile frame number counter has advanced to "9" while the BSS frame number has advanced to a value of "11." At time $t_5$, the frame number of "10" is decoded by the DSP and sent to the controller. At time $t_6$, when the controller finally receives the frame number of "10" corresponding to the message, the BSS has advanced "12" and the mobile frame counter has advanced to "10". The controller calculates the difference between the received message frame number ("10") and the stored mobile frame number counter value ("8"), which is "2". Since "2" is the time lag, in frames, for the process of decoding and sending the frame number from the DSP to the controller, "2" is added to the current frame number value "10" at time $t_6$ thereby yielding a value "12". Thus, at time $t_6$, both base station sub-system assigned message frame numbers and the mobile frame number counter are perfectly synchronized at "12," and will continue in that state, until the mobile station is powered down and then powered up again.

Figure 7:
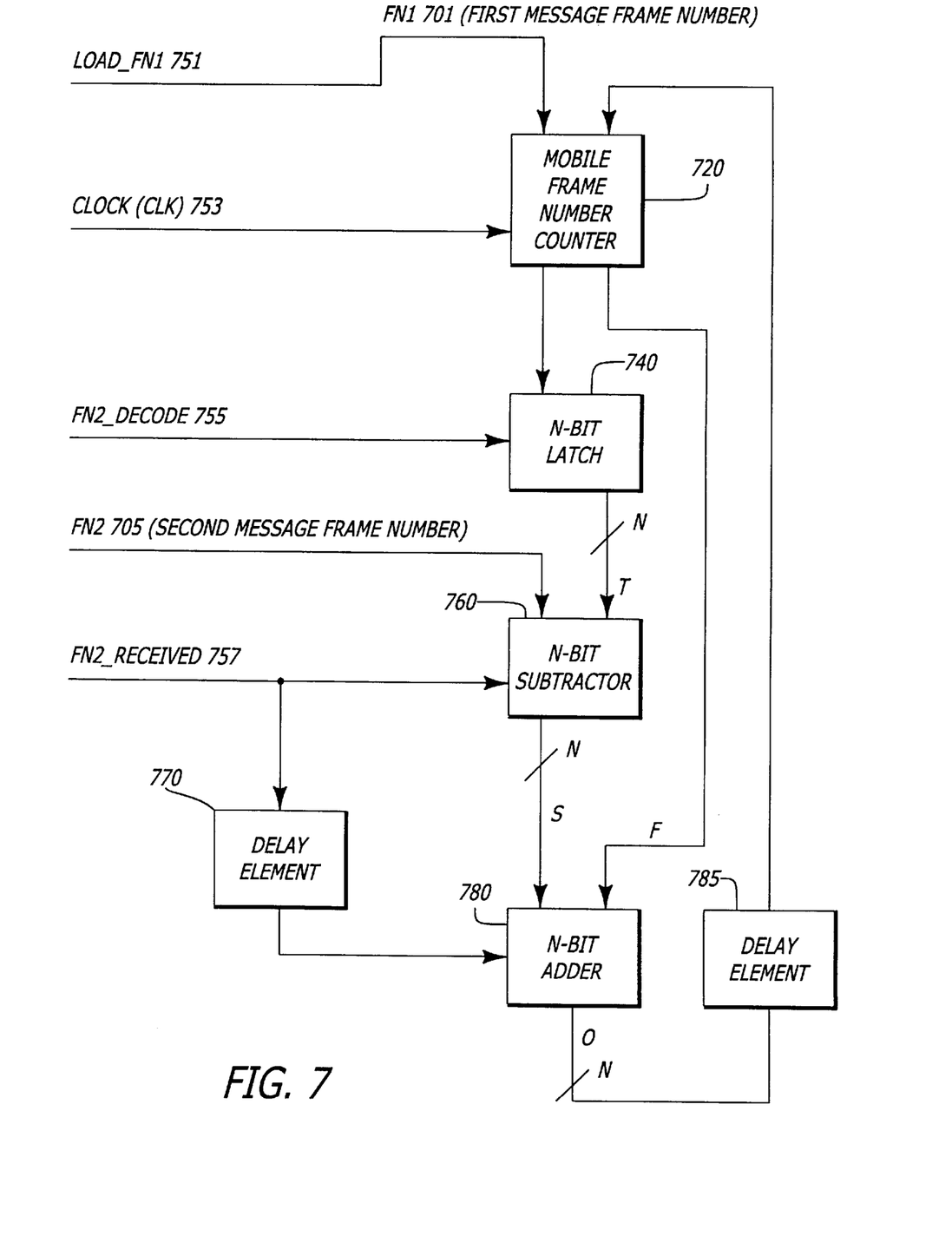
FIG. 7 illustrates a schematic diagram of a circuit embodiment of the invention.

FIG. 7 illustrates a schematic diagram of a circuit embodiment of the invention.

Though the invention may be implemented as a software method, it may also be implemented in a digital circuit, disposed on or near, but coupled to the controller circuitry in some fashion. FIG. 7 shows one such implementation.

Within the controller or at least coupled to the controller, a circuit such as the one illustrated in FIG. 7 may be provided. The circuit has four major components—a mobile frame number counter 720 (counter), an N-bit latch 740 (latch), an N-bit subtractor circuit 760 (subtractor) and an N-bit adder circuit 780 (adder). Counter 720 is clocked by clocking signal (CLK) 753 and upon power-up of the mobile station on which the circuit of FIG. 7 resides, the counter is enabled and begins to run. Counter 720 may employ several sub-components such as bit counters which count a certain fixed number of bits and then reset their operation, with each reset marking a new frame number. When a first message frame number (FN1) 701 is detected as received by the controller, the controller loads the value FN1 into counter 720 utilizing a signal LOAD_FN1 751. LOAD_FN1 751 is input to the counter and enables loading of FN1.

Thereafter, the counter 720 operates to increment upon the loaded value FN1 701. The output of the counter 720 is an N-bit number representing the frame number of the mobile station. When a second message frame number is received at radio but not yet decoded, the controller generates an FN2_DECODE signal 755 which enables the latch to connect to frame number counter 720. The latch holds the value of the counter until a second message frame number (FN2) 705 is decoded and sent to the controller by the DSP.

FN2 705 is a N-bit number representing the second frame number decoded by the DSP and received by the controller upon the radio finding another SCB and consequently, another message frame. The controller sends the decoded frame number value FN2 705 to the subtractor 760 by utilizing the FN2_RECEIVED signal 757. The output T of latch 740 is subtracted from FN2 705 by subtractor 760. Subtractor 760 outputs this difference as a N-bit value S, which represents the time lag in decoding and sending the message frame number to the controller. The value S is input to adder 780 along with current value F output by the counter. Adder 780 produces an output O, which is an n-bit value and loads it into counter 720.

Once O is successfully loaded into counter 720, the counter 720 becomes synchronized with the frame number counter of the base station. To ensure that the adder 780 receives valid and properly timed input values, the adder is enabled using the FN2_RECEIVED signal 757 which undergoes a suitable delay (by way of delay element 770) so that the output of subtractor 760 is valid. Further, to ensure that the output O of adder 780 is not prematurely loaded into the counter 720, an additional delay element 785 may be inserted between the adder 780 and counter 720.

The circuit of FIG. 7 is only one embodiment of circuitry which can perform synchronization. The invention can also be embodied by any combination of software, firmware or hardware as is appropriate to the system being synchronized. For instance, the circuitry of FIG. 7 may be embedded in a processor of a smart-phone or personal digital assistant, rather than residing as separate circuitry. Furthermore, while the invention has been described as operating with GSM, it can be easily adapted to any number of situations involving a mix of analog and digital components where a time lag in communicating information from one component to another creates a synchronization problem.

What is claimed is:

1. An apparatus for synchronizing between a first device and a second device, said first device including a counter loaded with a first message frame number, said apparatus comprising:

a latch coupled to said counter, said latch holding a first output of said counter;

a subtractor coupled to said latch to receive said first output of said counter, said subtractor receiving a second message frame number, said subtractor producing a second output which is the difference of said first output and said second message frame number; and an adder coupled to said subtractor and to said counter to receive a current value of said counter, said adder adding said current value to said second output to produce a compensated output, said compensated output loaded into said counter.

2. An apparatus for synchronizing according to claim 1 wherein said first message frame number and second message frame number identify message frames received by said first device.

3. An apparatus for synchronizing according to claim 1 wherein said first device includes a controller.

4. An apparatus for synchronizing according to claim 1 wherein said second device includes a base station sub-system of a cellular network.

5. An apparatus for synchronizing according to claim 2 wherein said first device includes a mobile station of a cellular network.

6. An apparatus for synchronizing according to claim 2 wherein said first message frame number and said second message frame number are carried over a time division multiple access system.

7. A method for synchronizing between a first device and a second device, said method comprising the steps of:

setting a counter on said first device equal to a first message frame number received from said second device, said first message frame number decoded before setting said counter on said first device;

calculating a time lag in sending a second message frame number from said second device to said first device, wherein calculating a time lag includes storing a value of said counter corresponding to a time when said second message frame number is received at said first device prior to decoding said second message frame number, and subtracting said stored value from said second message frame number; and adding said time lag to said counter on said first device to synchronize said counter on said first device with a counter on said second device, wherein said first device includes a mobile station and said second device includes a base station sub-system.

8. A method for synchronizing delay according to claim 7 wherein said first device includes a controller.

9. A method for synchronizing according to claim 8 wherein the step of decoding a first message frame number further comprises detecting a frequency correction burst and then detecting a synchronization burst.

10. A method for synchronizing according to claim 9 wherein the step of decoding further comprises detecting a synchronization burst.

11. A method for synchronizing according to claim 8 wherein said digital signal processor sends said first message frame number to a controller, said controller required to generate, using said counter on said first device, frame numbers which coincide with received message frame numbers.

12. A method for synchronizing according to claim 9 wherein said digital signal processor sends said second message frame number to a controller, said controller required to generate, using said counter on said first device, frame numbers which coincide with received message frame numbers.

13. A method for synchronizing according to claim 7 wherein said first device and said device communicate over a cellular network.

14. In a cellular system, an apparatus for synchronizing between a controller of a mobile station and a base station sub-system, said controller coupled to a counter loaded with a first message frame number, said apparatus comprising:

a latch coupled to said counter, said latch holding a first output of said counter;

a subtractor coupled to said latch to receive said first output of said counter, said subtractor receiving a second message frame number, said subtractor producing a second output which is the difference of said first output and said second message frame number; and an adder coupled to said subtractor and to said counter to receive a current value of said counter, said adder adding said current value to said second output to produce a compensated output, said compensated output loaded into said counter.

15. An apparatus for synchronizing according to claim 14 wherein said first message frame number and second message frame number identify message frames received by said controller.

* * * * *

UNITED STATES PATENT AND TRADEMARK OFFICE
CERTIFICATE OF CORRECTION

PATENT NO.   : 5,872,820
DATED        : February 16, 1999
INVENTOR(S)  : Upadrasta It is certified that error appears in the above-identified patent and that said Letters Patent is hereby corrected as shown below:

Column 5,
Lines 47 and 49, delete "TIME_", insert -- TIME_LAG --.

Signed and Sealed this

Twenty-ninth Day of July, 2003

JAMES E. ROGAN
*Director of the United States Patent and Trademark Office*